United States Patent [19]

Cunningham

[11] Patent Number: 5,183,313
[45] Date of Patent: Feb. 2, 1993

[54] TWO POSITION ADJUSTABLE PASSENGER ARRANGEMENT HAVING CAM, PLUNGER, AND PIVOTING LEVER

[75] Inventor: Douglas J. Cunningham, Portsmouth, England

[73] Assignee: L.A. Rumbold Limited, England

[21] Appl. No.: 713,112

[22] Filed: Jun. 10, 1991

[30] Foreign Application Priority Data

Jun. 20, 1990 [GB] United Kingdom ............... 9013717

[51] Int. Cl.$^5$ .................................................. A47C 1/02
[52] U.S. Cl. ................................... 297/344; 410/105; 248/429
[58] Field of Search ............... 297/344, 232, 243, 250, 297/257; 248/429, 430, 501, 503, 503.1; 244/122 R, 118.6; 410/102, 103, 104, 105

[56] References Cited

U.S. PATENT DOCUMENTS

| | | | |
|---|---|---|---|
| 1,735,518 | 11/1929 | Valkenburg et al. | 297/344 |
| 4,114,947 | 9/1978 | Nelson | 297/344 |
| 4,396,175 | 8/1983 | Long et al. | 410/105 X |
| 4,723,732 | 2/1988 | Gorges | 410/105 X |
| 4,856,738 | 8/1989 | Martin | 410/105 X |
| 4,913,489 | 4/1990 | Martin | 248/429 X |
| 4,936,527 | 6/1990 | Gorges | 410/105 X |

*Primary Examiner*—Kenneth J. Dorner
*Assistant Examiner*—James M. Gardner
*Attorney, Agent, or Firm*—Davis, Bujold & Streck

[57] ABSTRACT

In an adjustable seating system, allowing variation in the spacing between adjacent rows of passenger seats, e.g. in an aircraft, for use in a passenger vehicle, each row (14, 16, 18) is mounted on a longitudinal seat rail (30) secured to the floor. The seat rail (30) has a series of equally spaced openings (34) along its length for retaining the seating units (14, 16, 18) at any selected lengthwise location. Alternate rows (16) have seat adjustment means comprising a plunger (60, 144) for engaging in said rail (30) mounted for vertical movement between a rail-engaging position in which it engages with the rail (30) to restrain fore and aft movement and a release position in which it permits fore and aft movement of the seating unit (16), a foot (84, 156) for engaging in said rail (30) so as to resist both fore and aft movement and vertical movement, a lever (86, 158) pivotally mounted on the foot (84, 156) and having a cam follower (88, 160) engaging in vertically extending guide means (90, 162) secured to the seating unit (16), and coupling means (64, 132) responsive to displacement of the cam follower (88, 160) from the bottom of the guide means (90, 162) to move the plunger (60, 144) to its release position and adapted to return the plunger (60, 144) to its engaged position when the cam follower (88, 160) returns to the bottom of the guide means (90, 162).

6 Claims, 6 Drawing Sheets

TWO POSITION ADJUSTABLE PASSENGER ARRANGEMENT HAVING CAM, PLUNGER, AND PIVOTING LEVER

BACKGROUND OF THE INVENTION

This invention relates to adjustable passenger seating arrangement for vehicles, particularly aircraft.

Airlines require high utilization of their aircraft and it is uneconomic for an airliner to remain grounded for many hours in any twenty four hour period. However, the demand for seats on daytime flights is substantially greater than that for night flights. On the other hand, it is desirable to provide increased longitudinal spacing between seats on night flights so as to allow passengers to adopt a more comfortable sleeping position.

In an aircraft passenger cabin, it is commonplace for two or three passenger seats to be mounted on a common seat structure aligned and engaging longitudinally extending seat rails mounted on the floor or an underlying floor support structure. The seat-to-rail attachments generally comprise rail-engaging feet for resisting pitching forces, a deployable plunger for resisting fore and aft loads and an anti-rattle device to minimize or prevent chatter between the feet and the rail. Conventional feet comprise a shank portion engaging the seat structure terminating in a frusto-conical base portion engaging the rail. Each rail, of well known form, includes a passageway extending longitudinally therethrough whose lateral cross-section conforms substantially to the frusto-conical base portion and a series of equally spaced circular holes of diameter similarly conforming to that of the base portion extends between the passageway and the rail upper surface each pair of holes interconnected along a longitudinal centre line datum by a parallel slot of width at least equivalent to the foot shank diameter. This arrangement consequently provides a combination of circular apertures into which the feet are inserted and lips under which the frusto-conical base engages when the seat is moved forwards or rearwards one half pitch into locking engagement with the rail. The number of feet, associated with a particular seat assembly, depends on the loading characteristics but their fore and aft spacing will always conform with the rail configuration. Similarly, the fore and aft restraint usually a deployable plunger, is of diameter conforming to the circular aperture in the rail with which it is adjacently positioned in a fore and aft sense to engage when the feet are moved into locking engagement with the rail.

BRIEF SUMMARY OF THE INVENTION

The present invention aims to provide a seating system having means for moving a seat structure through a predetermined distance in the fore and aft direction.

According to the invention, in an adjustable seating system for use in a passenger vehicle, a floor mounted seat rail extends longitudinally through at least a portion of a passenger carrying compartment and at least three seating units are mounted on said seat rail; the seat rail including a series of equally spaced interconnected openings along its length for fixedly engaging and retaining the seating units at any selected lengthwise location; at least one of the seating units including seat adjustment means comprising a plunger for engaging in said rail mounted on a leg of said seating unit for vertical movement between a rail engaging-position in which it engages with the rail to restrain fore and aft movement and a release position in which it permits fore and aft movement of the seating unit, a foot for engaging in said rail so as to resist both fore and aft movement and vertical movement, a lever pivotally mounted on the foot and having a cam follower engaging in vertically extending guide means secured to the seating unit, and coupling means responsive to displacement of the cam follower from the bottom of the guide means to move the plunger to its release position and adapted to return the plunger to its engaged position when the cam follower returns to the bottom of the guide means.

The cam follower is positionable at the bottom of the guide means either when the seating unit is in a first position in which the lever projects forwardly from the foot or when the seating unit is in a second position in which the lever projects rearwardly from the foot. The distance between these two positions is arranged to be a multiple of the spacing between the openings in the rail so that the plunger can move into its engaged position when the seating unit is in either of these two positions.

The lever may be provided with manually operable means, for example a detachable lever for causing pivotal movement relative to the plunger.

DETAILED DESCRIPTION

Figure 1:
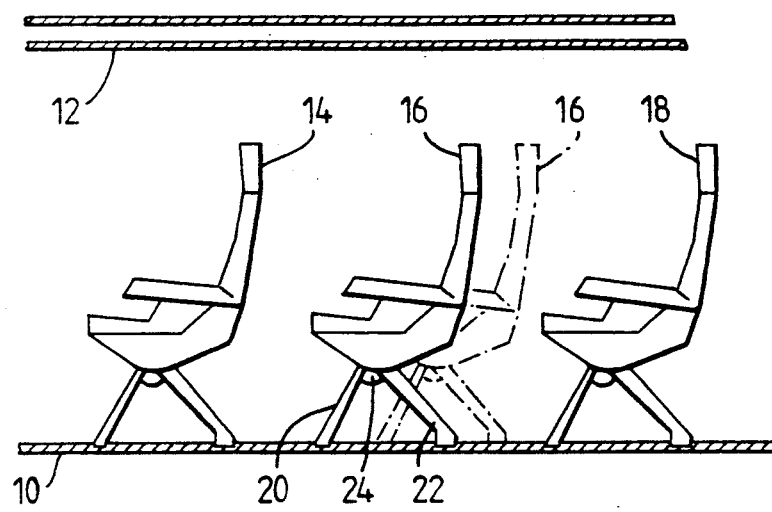
FIG. 1 is a diagrammatic side elevation in an aircraft passenger cabin illustrating the disposition of three seat rows.

FIG. 1 shows a portion of an aircraft passenger cabin having a floor 10, a ceiling 12 and three two-seat seating units 14, 16 and 18. The seating unit 16 has two side frames, each comprising a front leg 20, and a rear leg 22, the two frames being interconnected by a transverse member 24. Each of the side frames is aligned with a respective seat rail mounted in the floor 10. The construction of each seat rail and the manner of attachment of the seat units thereto is well known and is described, for example, in U.S. Pat. No. 4,856,738.

Figure 2:
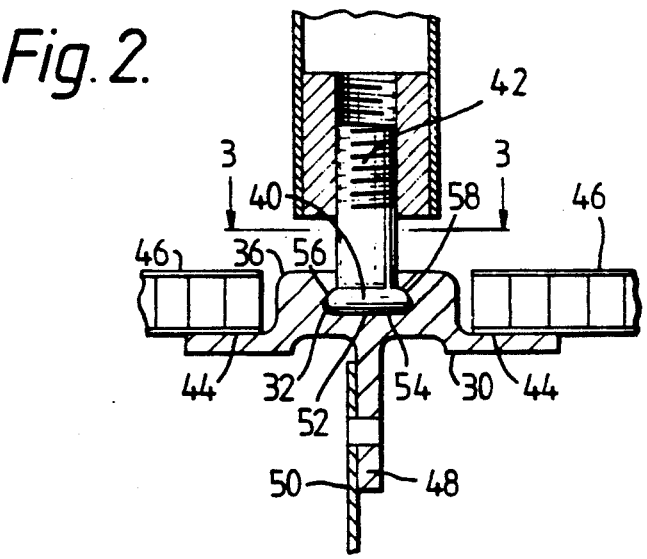
FIG. 2 is a cross section through a known seat rail installation illustrating the engagement of a seat leg therewith.
Figure 3:
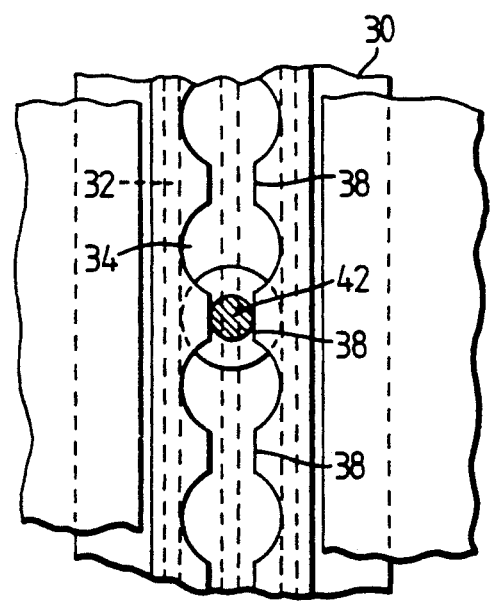
FIG. 3 is a cross sectional view taken on the line 3—3 in FIG. 2.

Referring to FIGS. 2 and 3, each seat rail 30 includes a longitudinal extending guideway slot 32. Throughout the length of the rail 30, equally spaced holes 34 extend vertically between the guideway slot and the seat rail upper surface 36, and longitudinal slots 38 interconnect the vertical holes 34. The slot 38 and the guideway slot 32 are configured to conform substantially to the shoulder portion 40 of an attachment stud 42 which protrudes from each back leg 22 of the seating unit 16, and the holes 34 are of clearance diameter to accommodate the stud shoulder 40. A similar stud (not shown) projects from each front leg. The seat rail further includes side flanges 44 for seating floor panels 46 and a vertical flange 48 for attachment to a structural member 50 of the aircraft.

The holes 34 are equally spaced at one inch pitch and the studs on each seat unit are appropriately spaced to ensure conformity with the rail. To install and positively engage the seat on the rail, it is positioned at its desired fore and aft location such that the studs 42 locate in the corresponding holes 34, stud face 52 seating on the lower surface 54 of the guideway slot 32. Once positioned, the seat is moved forwards or rearwards as required until the shoulder surface 56 engages under the lip 58, that is at an intermediate position between two adjacent holes 34, resulting in positive engagement of the seat as indicated in FIG. 2. As already stated, this method of connecting seats to floor rails is well known and does not form part of the present invention.

Figure 4:
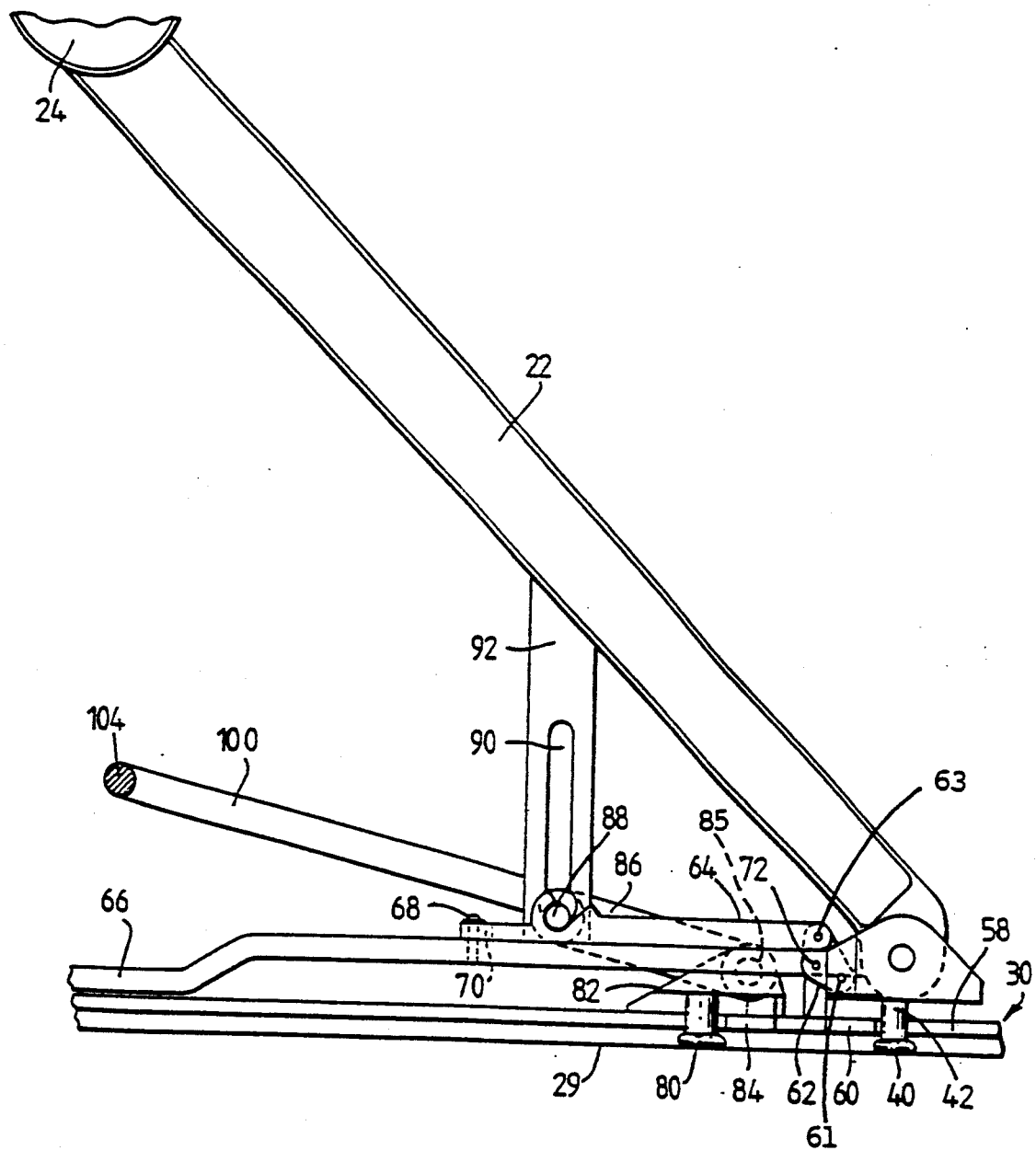
FIG. 4 is a side elevation of a rear leg, in accordance with a first embodiment of the invention, of the middle seating unit of the three rows illustrated in FIG. 1, in the position shown in solid lines.

FIG. 4 shows the stud 42 on the bottom of the leg 22 in engagement with the rail 30. Immediately in front of the stud 42 is a plunger 60 which is vertically movable relative to the leg 22 between an engaged positions (illustrated) and a release position. In the engaged position, it engages in the hole 34 immediately in front of the stud 42 so as to block movement of the stud 42 along the rail 30. In the release position, the plunger 60 is lifted clear of the rail 30, thereby freeing the stud 42 to slide. In order to effect this vertical movement, the plunger 60 is coupled by a pivot pin 61 to a bell crank lever 62 which is coupled by a pivot pin 63 to a slider 64 which is mounted on a frame member 66 of the seating unit 16, the frame member 66 extending between the bottom of the rear leg 22 and the bottom of the corresponding front leg 20. A screw 68 projects through a slot 70 in the slider 64 and engages in the frame member 66 so as to permit this sliding movement. The bell crank 62 is mounted on a pivot pin 72 at the rear end of the member 66.

In front of the stud 40, a second stud 80 also engages in the rail. The stud 80 is connected to a bracket 82 which has a plunger 84, similar to the plunger 60 in that it is vertically movable relative to the bracket 82. However, the plunger 84 is spring-biassed into its engaged position, as illustrated in FIG. 4 and can be displaced upwardly by means (not shown) to permit complete removal of the seating unit 16 from the aircraft. In normal use, once installed, the plunger 84 is permanently left in its engaged position to provide a fixed location for a pivot pin 85.

A lever 86 has one end coupled to the plunger 84 by the pivot pin 85. At its other end, the lever 86 carries a cam follower stud 88 which engages in a slot 90 in a vertical member 92 extending between the base member 66 and the leg 22. In its upper edge, the slider 64 has an open ended slot 96 which receives the cam follower stud 88 and the upper end of which is inclined rearwardly. The lever 86 has a socket 98 which detachably receives a handle 100. As can be seen from FIG. 5, the handle 100 extends across the seat so as to engage with a similar socket 102 associated with the leg 22 on the other side, and has a central hand grip 104.

When it is desired to move the seat 16 from the position shown in solid lines in FIG. 1 to the position shown in dotted lines, the handle 100 is moved in a clockwise direction about the pivot point of the lever 86 on the bracket 82, raising the cam follower stud 88. As the stud 88 disengages from the slot 96 in the slider 64, it displaces the latter to the left, as viewed in FIG. 4, so that the bell crank lever 62 raises the plunger 60 out of engagement with the rail 30. Continued angular movement of the handle 100 causes the follower 88 to push the vertical member 92, and with it, the whole seat unit 16, rearwardly until it is at a position midway between the two positions illustrated in FIG. 1, when the handle 100 is vertical and the stud 88 near the top of the slot 90. Further angular movement of the handle 100 towards the position shown in FIG. 6 moves the stud 88 back down the slot 90 until finally it engages with the inclined slot 96 in the slider 64 to push the plunger 60 back into engagement with the rail 58 to secure the seat in its new position, as illustrated in dotted lines in FIG. 1. In this position, the backrest of the seat 16 can be inclined almost to the horizontal, so that it lies on the seat cushion of the seat 18, and there is much more leg room between the seat 16 and the seat 14. Consequently, although the seat 18 cannot be occupied, the occupant of the seat 16 can be charged a higher fare in view of the more comfortable sleeping position provided by the invention.

When it is desired to return the aircraft to its full-capacity daytime condition, the lever 100 is pivoted back to the position illustrated in FIG. 4.

As already described, the lever 100 is detachable. Preferably, it is removed when the aircraft is in use so as to leave unobstructed baggage storage space under the seats.

If desired, the bell crank lever 62 may be replaced by a cam system.

Figure 7:
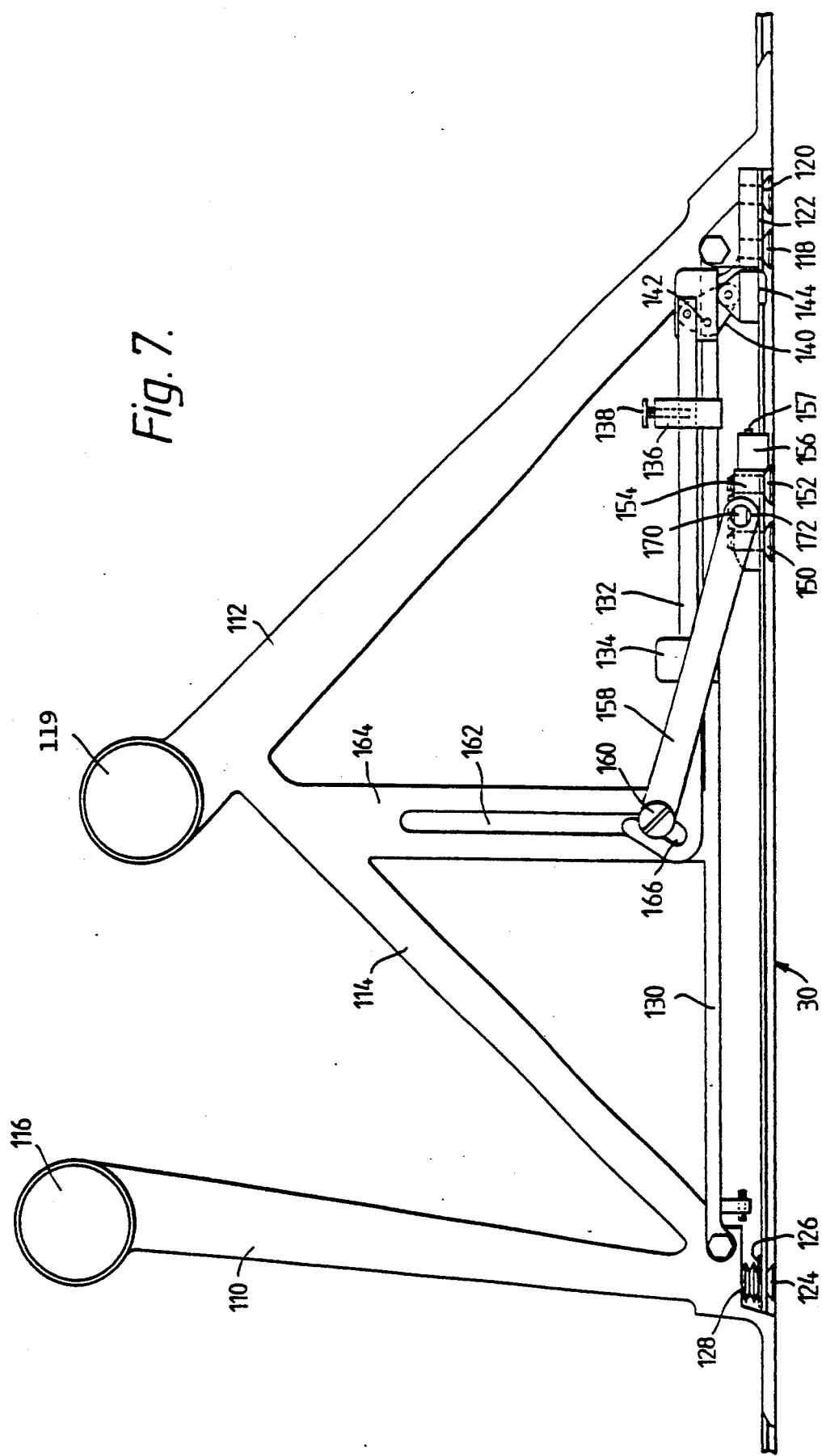
FIG. 7 is a side elevation of front and rear legs, in accordance with a second embodiment of the invention, of another seating unit similar to the middle seating unit of the three rows illustrated in FIG. 1, in the position shown in solid lines.
Figure 8:
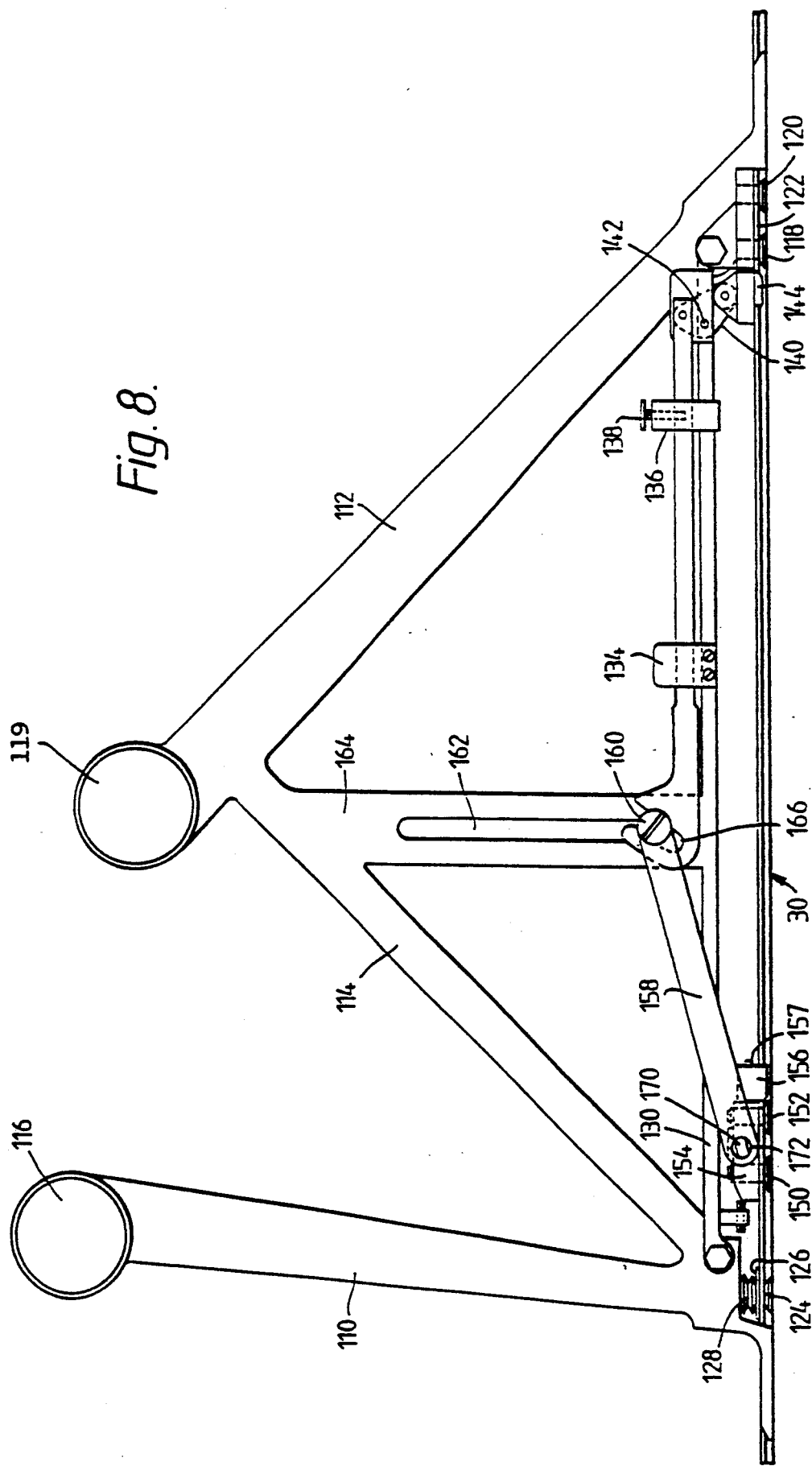
FIG. 8 is an elevational view, similar to FIG. 7 but with the middle seating unit in the position illustrated in dotted lines in FIG. 1.

FIGS. 7 and 8 illustrate another embodiment of the invention comprising a seating unit having two side frames, each comprising a front leg 110, a rear leg 112 and a diagonal brace 114 interconnecting the top of the rear leg 112 and the bottom of the front leg 110. The two side frames are interconnected by a first transverse member 116 at the top of the front legs 110 and a rear transverse member 118 at the top of the rear legs 112. As with the first embodiment of the invention, each of the side frames is aligned with a respective seat rail mounted in the aircraft floor, as illustrated in FIGS. 1 to 3.

On each side frame, the bottom of the rear leg 112 carries two studs 119 and 120 which are similar to the stud 42 of FIG. 1 and which are spaced apart from one another by a distance equal to the spacing between the holes 34 in the seat rails 30 (see FIG. 3). A T-shaped skid pad 122 is secured to the stems of the studs 118 and 120 so that the stem of the T-shaped skid pad 122 projects into the slot 32 in the seat rail 30 and its crossbar rests on the rail upper surface 36. The bottom of the front leg 110 carries a similar stud 124. A similar T-shaped skid pad 126 is slidably mounted on the shank of the stud 124 and biassed downwardly by Bellville washers 128.

Figure 5:
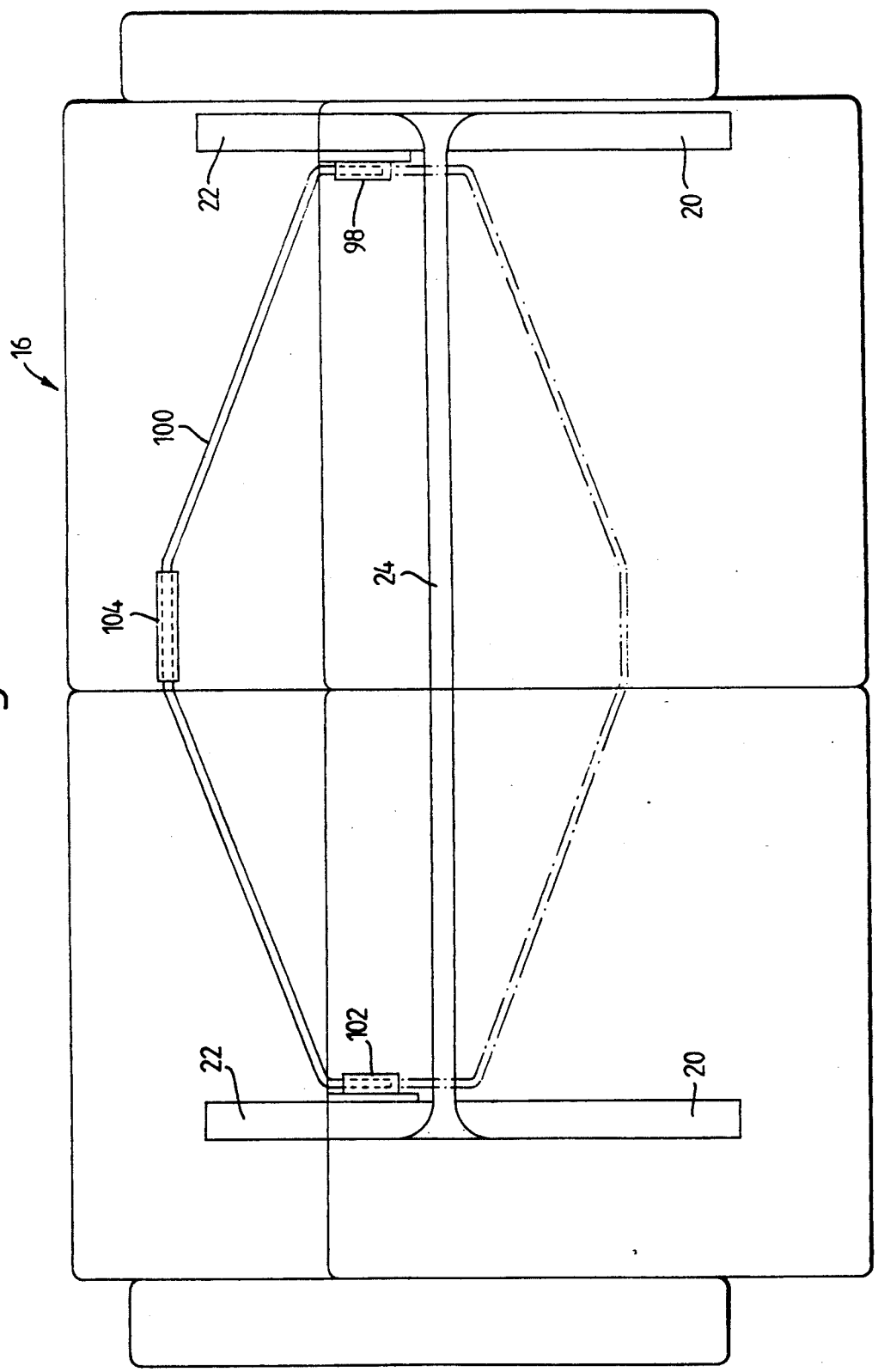
FIG. 5 is a schematic plan view of the middle seat of the seating unit shown in FIG. 1, drawn as if the seat portion and its cushion were transparent.
Figure 6:
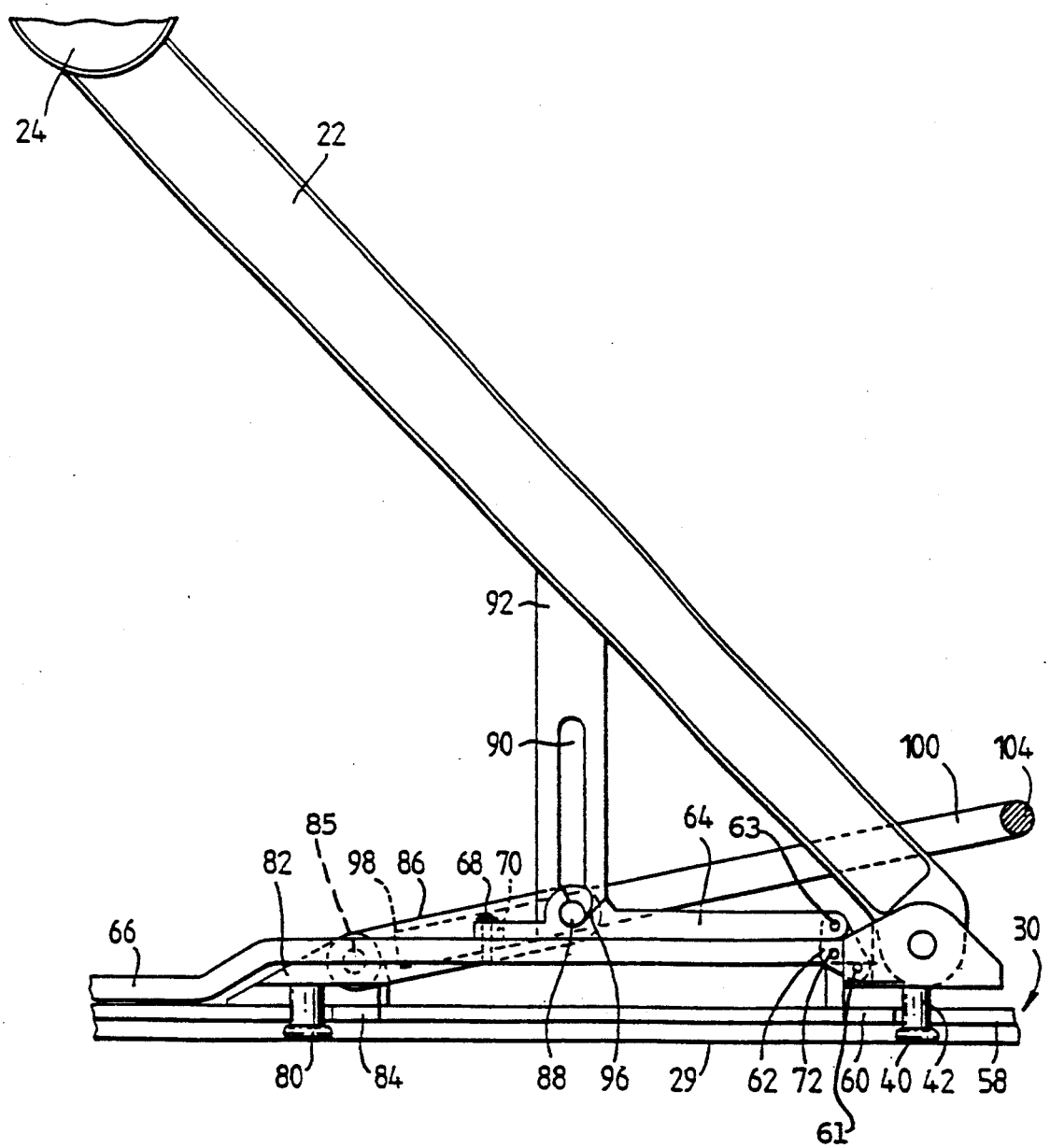
FIG. 6 is an elevational view, similar to FIG. 4 but with the middle seating unit in the position illustrated in dotted lines in FIG. 1.

The bottoms of the front leg 110 and rear leg 112 are interconnected by a frame member 130, similar to the frame member 66 of FIGS. 4 to 6. A slider 132, similar to the slider 64, is mounted in slide guides 134 and 136 which are secured to the frame member 130. The slide guide 136 in the aisle-side frame carries a catch 138 which is spring biassed into a hole in the slider 132 so as to lock the latter in position, as will be explained hereinafter.

The rear end of the slider 132 is pivotally coupled to one arm of a bell-crank lever 140, which is journalled on a pivot pin 142 mounted on the frame member 130 and which has its other arm pivotally coupled to a plunger 144 which is dimensioned to engage in one of the holes 34 of the rail 30 in a similar manner to the plunger 60 of FIGS. 4 to 6.

Between the front stud 124 and rear studs 118 and 120, a further pair of studs 150 and 152 also engage with the rail 30. The studs 150 and 152 are mounted on a bracket 154 which also carries a plunger 156 which is vertically movable relative to the bracket 154 into and out of engagement with the rail to permit complete removal of the seating unit from the aircraft. However, in normal use, the plunger 156 is permanently secured in its engaged position relative to the bracket 154 by a clamping screw 157. The arrangement is thus similar to that of the plunger 84 of FIGS. 4 to 6.

On each side frame, a lever 158, similar to the lever 86 of FIGS. 4 to 6, has one end pivotally coupled to the bracket 154. At its other end, the lever 158 carries a cam follower stud 160 which engages in a slot 162 in a vertical member 164 extending between the frame member 130 and the diagonal brace 114. The front end of the slider 132 has an open-ended slot 166 in its upper edge (similar to the slot 96 of FIGS. 4 to 6) which receives the cam follower stud 160.

Angular movement of the levers 158 between the position shown in FIG. 7 and the position shown in FIG. 8 moves the seat unit between a forward position, corresponding to the position of the seat 16 shown in solid lines in FIG. 1, to a rearward position similar to the position of the seat unit 16 shown in dotted lines in FIG. 1. However, the means for effecting angular movement of the levers 158 differs from that illustrated in FIGS. 4 to 6.

The two levers 158 are interconnected at their lower ends by a torque rod 170 which extends across the bottom of the seat under the aircraft floor carpet. The torque rod 170 is secured fast with the levers 158 and is journalled in the brackets 154. At its end facing the aircraft aisle, the torque rod 170 has flat surfaces 172 which can be engaged by a detachable tool to effect the necessary angular movement. However, before the slider 132 on the aisle-side frame can move, it is necessary to raise the spring loaded catch 138 so as to disengage its bottom end from the recess in the slider 132.

The embodiment illustrated in FIGS. 7 and 8 has the advantage that movement of the seat unit between its two positions can be effected from the aircraft aisle.

I claim:

1. An adjustable seating system, for use in a passenger vehicle, comprising a floor-mounted seat rail adapted to extend longitudinally through at least a portion of a passenger carrying compartment and at least three seating units mounted on said seat rail; the seat rail including a series of equally spaced interconnected openings along the length of said rail for fixedly engaging and retaining the seating units at any selected lengthwise location; at least one of the seating units including seat adjustment means comprising:

a first plunger for engaging in said rail mounted on a leg of said seating unit for vertical movement between a rail-engaging position in which said plunger engages with the rail to restrain fore and aft movement and a release position in which said first plunger permits fore and aft movement of the seating unit, a second plunger for engaging in said rail so as to resist both fore and aft movement and vertical movement, a lever pivotally mounted on the second plunger, vertically extending guide means secured to the at least one seating unit, a cam follower secured to said lever and engaging in said vertically extending guide means so as to be positionable at the bottom of the guide means either when the seating unit is in a first position in which the lever projects forwardly from the second plunger or when the seating unit is in a second position in which the lever projects rearwardly from the second plunger, the distance between these two positions being a multiple of the spacing between the opening in the rail so that the plunger can move into an engaged position when the seating unit is in either of these two positions, and coupling means responsive to displacement of the cam follower from the bottom of the guide means to move the first plunger to the release position and adapted to return the first plunger to the rail-engaging position when the cam follower returns to the bottom of the guide means.

2. An adjustable seating system according to claim 1, wherein the lever is provided with manually operable means for causing pivotal movement relative to the plunger.

3. An adjustable seating system according to claim 2, wherein the manually operable means comprises a detachable lever.

4. An adjustable seating system according to claim 1, wherein the coupling means responsive to displacement of the cam follower comprises a horizontally moveable slider having a cam formation at one end and means connected to the plunger at an opposite end.

5. An adjustable seating system according to claim 4, wherein said means connected to the plunger comprises a bell-crank lever.

6. An adjustable seating system according to claim 4, wherein said cam formation comprises an open-ended slot, the cam follower being adapted to cause displacement of said slider during initial upward movement of the cam follower from the bottom of the guide means and to disengage from said open-ended slot during subsequent upward movement in which engagement of the cam follower with the guide means causes movement of the seating unit along the track.

* * * * *